Nov. 11, 1941.  C. G. VEINOTT  2,262,376
DUAL-SPEED CAPACITOR MOTOR
Filed Nov. 22, 1938
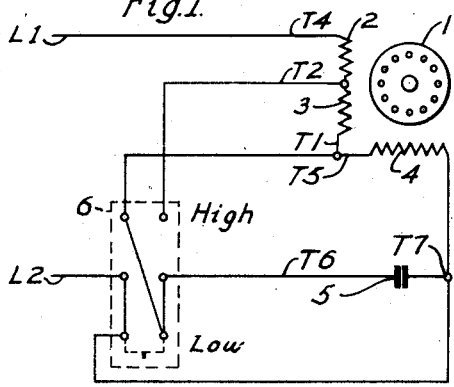
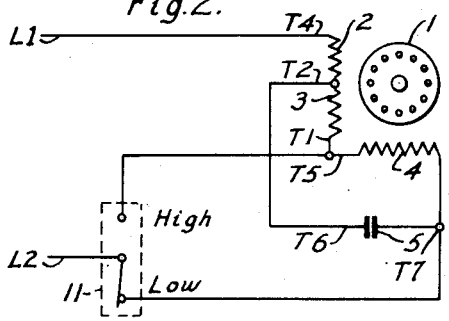
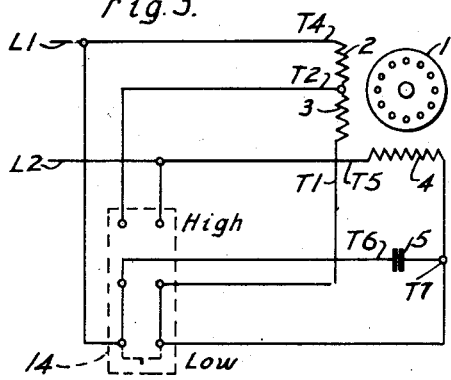
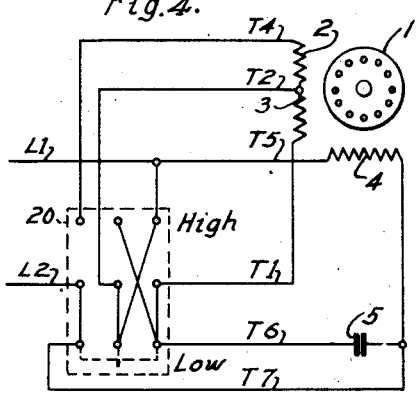
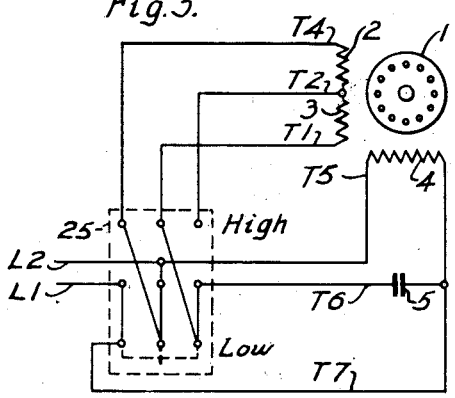
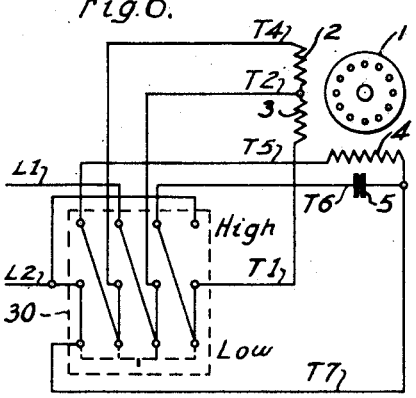
WITNESSES:
H. F. Susser.
Wm. C. Groome
INVENTOR
Cyril G. Veinott.
BY O. B. Buchanan
ATTORNEY Patented Nov. 11, 1941

2,262,376

UNITED STATES PATENT OFFICE 2,262,376

DUAL-SPEED CAPACITOR MOTOR

Cyril G. Veinott, Lima, Ohio, assignor to Westinghouse Electric & Manufacturing Company, East Pittsburgh, Pa., a corporation of Pennsylvania Application November 22, 1938, Serial No. 241,743

11 Claims. (Cl. 172—278)

My invention relates to a dual-speed capacitor-motor, that is, a single-phase induction motor starting and running as a capacitor motor, with means for so changing the connections that the motor will operate at either one of two different speed-ranges.

More particularly, my invention relates to the dual-speed 220-volt operation of a convertible single-phase capacitor-motor which is particularly adaptable for driving small propeller fans and blowers, the motor being so designed that, by simple changes in the terminal connections, the same motor can be utilized either as a single-speed 110-volt motor, a single-speed 220-volt motor, a two-speed 110-volt motor, or a two-speed 220-volt motor, and, with the simple addition of a suitable variable-voltage controller, as a multi-speed motor having three or more speeds and operating on either 110 volts or 220 volts. Heretofore, such motors have not been built with provision for the second or low speed, when operated on 220 volts, and it is this particular operation to which my invention particularly relates.

With the foregoing and other objects in view, my invention consists of the constructions, combinations, apparatus, methods and systems hereinafter described and claimed, and illustrated in the accompanying drawing showing six different diagrammatic views of circuits and apparatus illustrating my invention in six different forms of embodiment.

All six forms of embodiment, as illustrated in the drawing, utilize the same motor, comprising a squirrel-cage rotor-member 1, and a stator-member comprising a main winding built in two similar parts or halves 2 and 3, each part being wound with a portion thereof on every pole of the motor, as is well understood, and an auxiliary winding 4 which is displaced spatially from the main winding 2—3 by preferably 90 electrical degrees. The two main windings 2 and 3 make the motor adaptable for reconnection, either as a 110-volt motor, with these two windings connected in parallel, or as a 220-volt motor, with these two windings connected in series. As my invention involves only the 220-volt connections, these two main winding-portions 2 and 3 are shown as being connected in series, so that they have a common intermediate terminal T2, and two end-terminals T4 and T1, respectively.

The auxiliary winding 4 is normally the capacitor-winding of the motor, usually having more turns than either one of the main windings 2 or 3. In one form of embodiment of my motor, the capacitor-winding 4 has as many turns as both of the main windings 2 and 3 put together, whereas, in other forms, the capacitor winding has more turns than the sum of the main-winding turns, the selection of the ratios of these turns being a convenient means whereby the relative speeds of the high and low-speed connections may be adjusted, in the design of the motor. The ratios of turns may be partly fixed by these considerations and partly by those normal considerations known to the art of designing capacitor motors. The capacitor-winding 4 has two terminals T5 and T7, the terminal T7 being also one of the terminals of a capacitor 5, the other electrode of which constitutes the terminal T6 of the motor.

My invention relates to means for rearranging these six motor-terminals T1, T2, T4, T5, T6, and T7, so as to provide a motor which is convertible from a high-speed 220-volt motor to a low-speed 220-volt motor, and vice versa. In the six different figures of the drawing, I have shown six different double-throw switches 6, 11, 14, 20, 25 and 30, as convenient means for changing the motor from the high-speed connections, corresponding to the upper position of the switch, to the low-speed connections, corresponding to the lower position of the switch. While I have illustrated double-throw switches for this purpose, it will be understood that any other equivalent means for reconnecting or rearranging the motor-terminals may be utilized, if desired.

In all six figures, the high-speed connection is the same, this being the conventional 220-volt connection which has heretofore been utilized for dual-voltage capacitor-motors of the type to which my invention particularly relates. In this high-speed connection, the line-terminals L1 and L2 are connected, with one line L1 connected to the motor-terminal T4, and with the other line L2 connected to the two motor-terminals T1 and T5, while the motor-terminals T2 and T6 are connected together. As a result of these connections, the two main windings 2 and 3 are connected in series with each other, across the alternating-current line L1—L2, while the capacitor-winding 4 is connected in series with the capacitor 5 in another circuit which is in shunt relation to one of the main windings, such as the winding 3, so that approximately one-half of the line-voltage is impressed on the capacitor-winding 4 with its serially connected capacitor 5. It will be understood, however, that the full line-voltage might have been utilized for the capacitor-winding, instead of half of the line-voltage.

In the embodiments of my invention shown in Figs. 1, 2 and 3, the low-speed connection is obtained by connecting all three stator windings 2, 3 and 4, in series-circuit relation, across the line L1—L2, with the capacitor 5 connected in shunt-circuit relation around only a part of these windings, thereby obtaining various low-speed connections operating at different speeds, according to the particular connection. The series connection of all three stator windings 2, 3 and 4 results in a diminished magnetic flux in the motor, hence causing the motor to operate with a higher slip, or lower speed.

Referring to Fig. 1, the low-speed position of the switch 6 causes the line L2 to be connected to the motor-terminal T7, and causes the motor-terminal T6 to be connected to the two motor-terminals T1 and T5. The result of this connection is that the three stator windings 2, 3 and 4 are connected in a series circuit extending from the line-conductor L1 to the line-conductor L2, while the capacitor 5 is connected in shunt relation to the auxiliary winding 4.

In Fig. 2, the switch 11, in its low-speed position, connects the line-conductor L2 to the motor terminal T7, leaving the other connections the same as in the high-speed connection of the motor. This results in causing the three stator windings 2, 3 and 4 to be serially connected across the line L1—L2, while the capacitor 5 is connected in shunt around both the capacitor winding 4 and one of the main windings 3.

In the Fig. 3 connection, the switch 14 is designed to have a low-speed position in which the line-conductor L1 is connected to the motor-terminals T4 and T6, and the motor-terminal T1 is disconnected from the motor-terminal T5 and reconnected to the motor-terminal T7. The result of these connections is that the three stator windings 2, 3 and 4 are connected across the line L1—L2 in series with the other, but with the auxiliary winding 4 reversed as compared to the connections shown in Figs. 1 and 2, while the capacitor 5 is connected in shunt relation across both of the main windings 2 and 3. The auxiliary winding 4 thus becomes the main winding of the motor, while the current is dephased in the main windings 2 and 3 by reason of the parallel-connected capacitor 5. The reversal of the capacitor winding 4, relative to the main windings 2 and 3, is necessary in order to maintain the same direction of rotation during the low-speed operation as during the high-speed operation.

In the embodiments of my invention shown in Figs. 4, 5 and 6, the low-speed operation is obtained by utilizing the auxiliary winding 4 as the line-energized or main winding of the motor, and by connecting one or both of the main-winding portions 2 and 3 in a shunt circuit including the capacitor 5, so that the main-winding portion or portions become the capacitor-winding of the motor.

In Fig. 4, the double-throw switch provides low-speed connections according to which the line-conductor L1 is connected to the motor-terminal T7, and the line-conductor L2 is connected to the motor-terminals T5 and T2, while the motor-terminal T1 is disconnected from T5 and reconnected to T6. The result of this connection is that the auxiliary winding 4 is connected directly across the line L1—L2, whereas the stator-winding 3 and the capacitor 5 are serially connected in a shunt circuit connected across the line L2—L1 in shunt relation to the auxiliary winding 4. The auxiliary winding 4 thus becomes the main winding of the motor, while the main winding 3 becomes the capacitor-winding of the motor. In this system of connections, it is necessary or desirable for the auxiliary winding 4 to have more turns than the combined main windings 2 and 3, so that the main flux of the motor will be reduced, in comparison to the flux obtained in the high-speed connection when the two main windings 2 and 3 are utilized as the main stator-windings of the motor. With the low-speed connections shown in Fig. 4, the main-winding portion 2 is idle.

Fig. 5 represents a variation of the Fig. 4 connections, whereby both of the main windings 2 and 3 are utilized as the capacitor winding of the motor. In this form of embodiment of my invention, the low-speed position of the switch 25 causes the line-conductor L1 to be connected to the motor-terminal T7, and the line-conductor L2 to be connected to the motor-terminals T5 and T4, while the motor-terminals T1 and T6 are connected to each other. The result of these connections is the same as in Fig. 4, except the shunt-circuit comprises the two main motor-windings 2 and 3 and the capacitor 5, all connected in series with each other and in shunt relation to the auxiliary winding 4, across the line L2—L1.

In Fig. 6, the low-speed position of the double-throw switch 30 causes the line-conductor L1 to be connected to the motor-terminal T2, and the line-conductor L2 to be connected to the motor-terminal T7, while the motor-terminal T4 is connected to the motor-terminal T5, and the motor-terminal T1 is connected to the motor-terminal T6. The result of these connections is that the main winding 2 is serially connected to the auxiliary winding 4 in a main line-energized circuit connected across the line L1—L2, whereas the other main winding 3 is connected in series with the capacitor 4 in a shunt circuit connected in shunt relation to the main line-energized circuit. The addition of the winding-turns of the main-winding section 2, added in space-quadrature to the auxiliary winding 4, increases the effective turns of the main line-energized circuit of the motor, thus reducing the air-gap flux, and hence increasing the slip and reducing the speed of operation of the motor. The other winding-portion 3 is utilized as the capacitor winding of the motor.

From the foregoing description, it will be perceived that my invention provides a means for obtaining a second or low-speed connection for a conventional design of motor, thus extending the range of usefulness or convertibility of the motor.

While I have illustrated my invention in several different forms of embodiment, representing the general principles of my invention, I wish it to be understood that various changes in detail may be adopted by the skilled workers of the art without departing from certain essential principles of the invention. I desire, therefore, that the appended claims shall be accorded the broadest interpretation consistent with their language and the prior art.

I claim as my invention:

1. A dual-speed capacitor-motor comprising a rotor-member having closed-circuited secondary windings, a stator-member comprising a first stator-winding, a second stator-winding, the two stator-windings being displaced spatially from each other, a capacitor, means for, at times, operating said motor at a relatively high speed from a single-phase line with the first stator-winding connected in a line-energized circuit and with the capacitor connected in a different circuit in series-circuit relation to the second stator-winding, said different circuit being in shunt relation to at least a part of said first stator-winding, and means for, at other times, operating said motor at a relatively low speed from said single-phase line with both of said stator-windings in series relation to each other, in a circuit energized from said single-phase line, and with the capacitor connected in shunt-circuit relation to only a portion of said line-energized circuit, said portion containing all of said second stator-winding.

2. A dual-speed capacitor-motor comprising a rotor-member having closed-circuited secondary windings, a stator-member comprising a first stator-winding, a second stator-winding, the two stator-windings being displaced spatially from each other, a capacitor, means for, at times, operating said motor at a relatively high speed from a single-phase line with the first stator-winding connected in a line-energized circuit and with the capacitor connected in a different circuit in series-circuit relation to the second stator-winding, said different circuit being in shunt relation to at least a part of said first stator-winding, and means for, at other times, operating said motor at a relatively low speed from said single-phase line with all of the second stator-winding and at least some of the first stator winding serially connected in a line-energized circuit, and with the capacitor connected in a shunt circuit around a portion of the windings comprising said last-mentioned line-energized circuit.

3. A dual-speed capacitor-motor comprising a rotor-member having closed-circuited secondary windings, a stator-member comprising a first stator-winding, a second stator-winding, the two stator-windings being displaced spatially from each other, a capacitor, means for, at times, operating said motor at a relatively high speed from a single-phase line with the first stator-winding connected in a line-energized circuit and with the capacitor connected in a different circuit in series-circuit relation to the second stator-winding, said different circuit being in shunt relation to at least a part of said first stator-winding, and means for, at other times, operating said motor at a relatively low speed from said single-phase line with all of both of said stator-windings serially connected in a line-energized circuit, and with the capacitor connected in shunt around a portion of the windings comprising said last-mentioned line-energized circuit.

4. A dual-speed capacitor-motor comprising a rotor-member having closed-circuited secondary windings, a stator-member comprising a first stator-winding, a second stator-winding, the two stator-windings being displaced spatially from each other, a capacitor, means for, at times, operating said motor at a relatively high speed from a single-phase line with the first stator-winding connected in a line-energized circuit and with the capacitor connected in a different circuit in series-circuit relation to the second stator-winding, said different circuit being in shunt relation to at least a part of said first stator-winding, and means for, at other times, operating said motor at a relatively low speed from said single-phase line with said second stator-winding connected in a line-energized circuit, and with the capacitor connected in a different circuit in series-circuit relation to at least some of said first stator-winding and in shunt relation to at least some of said last-mentioned line-energized circuit.

5. A dual-speed capacitor-motor comprising a rotor-member having closed-circuited secondary windings, a stator-member comprising a first stator-winding, a second stator-winding, the two stator-windings being displaced spatially from each other, said first stator-winding comprising two serially connected parts, each part having a portion thereof on every pole of the motor, a capacitor, means for, at times, operating said motor at a relatively high speed from a single-phase line with the two parts of said first stator-winding serially connected in a line-energized circuit, and with the capacitor and the second stator-winding serially connected in another circuit which is in shunt relation to one of the parts of said first stator-winding, and means for, at other times, operating said motor at a relatively low speed from said single-phase line with both of said stator-windings in series relation to each other, in a circuit energized from said single-phase line, and with the capacitor connected in shunt-circuit relation to only a portion of said line-energized circuit, said portion containing all of said second stator-winding.

6. A dual-speed capacitor-motor comprising a rotor-member having closed-circuited secondary windings, a stator-member comprising a first stator-winding, a second stator-winding, the two stator-windings being displaced spatially from each other, said first stator-winding comprising two serially connected parts, each part having a portion thereof on every pole of the motor, a capacitor, means for, at times, operating said motor at a relatively high speed from a single-phase line with the two parts of said first stator-winding serially connected in a line-energized circuit, and with the capacitor and the second stator-winding serially connected in another circuit which is in shunt relation to one of the parts of said first stator-winding, and means for, at other times, operating said motor at a relatively low speed from said single-phase line with the second stator-winding and at least one of the parts of the first stator-winding serially connected in a line-energized circuit, and with the capacitor connected in a shunt circuit around a portion of the windings comprising said last-mentioned line-energized circuit.

7. A dual-speed capacitor-motor comprising a rotor-member having closed-circuited secondary windings, a stator-member comprising a first stator-winding, a second stator-winding, the two stator-windings being displaced spatially from each other, said first stator-winding comprising two serially connected parts, each part having a portion thereof on every pole of the motor, a capacitor, means for, at times, operating said motor at a relatively high speed from a single-phase line with the two parts of said first stator-winding serially connected in a line-energized circuit, and with the capacitor and the second stator-winding serially connected in another circuit which is in shunt relation to one of the parts of said first stator-winding, and means for, at other times, operating said motor at a relatively low speed from said single-phase line with all of said stator windings serially connected in a line-energized circuit, and with the capacitor connected in a shunt circuit around a portion of the windings comprising said last-mentioned line-energized circuit.

8. A dual-speed capacitor-motor comprising a rotor-member having closed-circuited secondary windings, a stator-member comprising a first stator-winding, a second stator-winding, the two stator-windings being displaced spatially from each other, said first stator-winding comprising two serially connected parts, each part having a portion thereof on every pole of the motor, a capacitor, means for, at times, operating said motor at a relatively high speed from a single-phase line with the two parts of said first stator-winding serially connected in a line-energized circuit, and with the capacitor and the second stator-winding serially connected in another circuit which is in shunt relation to one of the parts of said first stator winding, and means for, at other times, operating said motor at a relatively low speed from said single-phase line with the second stator-winding and at least one of the parts of the first stator-winding serially connected in a line-energized circuit, and with the capacitor connected in a shunt circuit around said second stator-winding.

9. A dual-speed capacitor-motor comprising a rotor-member having closed-circuited secondary windings, a stator member comprising a first stator-winding, a second stator-winding, the two stator-windings being displaced spatially from each other, said first stator-winding comprising two serially connected parts, each part having a portion thereof on every pole of the motor, a capacitor, means for, at times, operating said motor at a relatively high speed from a single-phase line with the two parts of said first stator-winding serially connected in a line-energized circuit, and with the capacitor and the second stator-winding serially connected in another circuit which is in shunt relation to one of the parts of said first stator-winding, and means for, at other times, operating said motor at a relatively low speed from said single-phase line with all of said stator-windings serially connected in a line-energized circuit, and with the capacitor connected in shunt around said second stator-winding.

10. A dual-speed capacitor-motor comprising a rotor-member having closed-circuited secondary windings, a stator-member comprising a first stator-winding, a second stator-winding, the two stator-windings being displaced spatially from each other, said first stator-winding comprising two serially connected parts, each part having a portion thereof on every pole of the motor, a capacitor, means for, at times, operating said motor at a relatively high speed from a single-phase line with the two parts of said first stator-winding serially connected in a line-energized circuit, and with the capacitor and the second stator-winding serially connected in another circuit which is in shunt relation to one of the parts of said first stator-winding, and means for, at other times, operating said motor at a relatively low speed from said single-phase line with all of said stator-windings serially connected in a line-energized circuit, and with the capacitor connected in shunt around said second stator-winding and one of the parts of said first stator-winding.

11. A dual-speed capacitor-motor comprising a rotor-member having closed-circuited secondary windings, a stator-member comprising a first stator-winding, a second stator-winding, the two stator-windings being displaced spatially from each other, said first stator-winding comprising two serially connected parts, each part having a portion thereof on every pole of the motor, a capacitor, means for, at times, operating said motor at a relatively high speed from a single-phase line with the two parts of said first stator-winding serially connected in a line-energized circuit, and with the capacitor and the second stator-winding serially connected in another circuit which is in shunt relation to one of the parts of said first stator-winding, and means for, at other times, operating said motor at a relatively low speed from said single-phase line with said second stator-winding connected in a line-energized circuit, and with the capacitor connected in a different circuit in series-circuit relation to at least one of the parts of said first stator-winding and in shunt relation to at least some of said last-mentioned line-energized circuit.

CYRIL G. VEINOTT.